United States Patent [19]

Nudelman et al.

[11] 4,115,138
[45] Sep. 19, 1978

[54] RAW MIXTURE FOR THE PRODUCTION OF CEMENT

[76] Inventors: Boris Izrailovich Nudelman, Chilanzar, kvartal 8, 27, kv. 48; Alexandr Sergeevich Sventsitsky, Severo-Vostok, 50, kv. 64; Marsel Yanovich Bikbau, Massiv Junus-Abad B-2, 21, kv. 58; Isaak Mozesovich Bun, Chilanzar, kvartal 8, 6a, kv. 19; Arnold Arnoldovich Kevvai, Massiv Kara-Kamysh 1/3, 51, kv. 42, all of Tashkent, U.S.S.R.

[21] Appl. No.: 799,767

[22] Filed: May 23, 1977

[51] Int. Cl.$^2$ ................................ C04B 7/02
[52] U.S. Cl. ................................ 106/100
[58] Field of Search .................. 106/89, 100, 104

[56] References Cited

U.S. PATENT DOCUMENTS

| 3,628,973 | 12/1971 | Greening et al. | 106/100 |
| 3,782,992 | 1/1974 | Uchikawa et al. | 106/89 |
| 3,864,138 | 2/1975 | Uchikawa et al. | 106/89 |
| 3,942,994 | 3/1976 | Murray et al. | 106/104 |
| 3,947,283 | 3/1976 | Uchikawa et al. | 106/104 |
| 4,028,126 | 6/1977 | Mori et al. | 106/104 |

Primary Examiner—J. Poer
Attorney, Agent, or Firm—Robert E. Burns; Emmanuel J. Lobato; Bruce L. Adams

[57] ABSTRACT

A raw mixture for the production of cement consisting of calcareous, aluminous, silicaceous, ferrous, magnesium-containing components and calcium chloride; said components being contained in the raw mixture in the following proportions, per cent by weight:

| | |
|---|---|
| calcareous component (calculated for CaO) | 30 to 42.3 |
| silicaceous component (calculated for $SiO_2$) | 12.5 to 17.5 |
| aluminous component (calculated for $Al_2O_3$) | 1.6 to 12.4 |
| ferrous component (calculated for $Fe_2O_3$) | 0.6 to 4.4 |
| magnesium-containing component (calculated for MgO) | 1.5 to 8 |
| calcium chloride | 6 to 20 |
| losses at calcination | the balance. |

The above composition makes it possible to perform calcination of the raw mixture at substantially lower temperatures (within the range of from 1,000° to 1,100° C) and to obtain cement possessing a higher activity.

5 Claims, No Drawings

RAW MIXTURE FOR THE PRODUCTION OF CEMENT

BACKGROUND OF THE INVENTION

The present invention relates to the production of building materials and, more specifically, to raw mixtures for the production of cement.

A raw mixture for the production of cement is known which consists of calcareous, silicaceous, aluminous, ferrous components and calcium chloride; the components being contained in said prior art mixture in the following proportions, percent by weight:

| | |
|---|---|
| calcareous component (calculated for CaO) | 52 to 65 |
| silicaceous component (calculated for $SiO_2$) | 7.2 to 15.5 |
| aluminous component (calculated for $Al_2O_3$) | 20 to 35 |
| ferrous component (calculated for $Fe_2O_3$) | below 2 |
| calcium chloride | 2.6 to 5.2 |
| losses at calcination | the balance. |

This known raw mixture has certain disadvantages which include the necessity of performing calcination of the mixture at a temperature within the range of from 1,300° to 1,400° C. which calcination results in the production of a low-activity cement.

SUMMARY OF THE INVENTION

It is an object of the present invention to provide a raw mixture composition for the production of cement which enable calcination of said mixture at substantially lower temperatures and production, therefore, of a high-activity cement.

This and other objects of the present invention are accomplished by a raw mixture for the production of cement consisting of calcareous, silicaceous, aluminous, ferrous, magnesium-containing components and calcium chloride; the components being contained in the raw mixture in the following proportions, percent by weight:

| | |
|---|---|
| calcareous component (calculated for CaO) | 30 to 42.3 |
| silicaceous component (calculated for $SiO_2$) | 12.5 to 17.5 |
| aluminous component (calculated for $Al_2O_3$) | 1.6 to 12.4 |
| ferrous component (calculated for $Fe_2O_3$) | 0.6 to 4.4 |
| magnesium-containing component (calculated for MgO) | 1.5 to 8 |
| calcium chloride | 6 to 20 |
| losses at calcination | the balance. |

DESCRIPTION OF THE INVENTION

The raw mixture according to the present invention makes it possible to reduce the calcination temperature to 1,000° to 1,100° C. and to obtain, as a result, a high-activity cement (thus, ultimate compression strength for samples consisting of 1 part by weight of cement, 3 parts by weight of quartz sand and 0.5 part by weight of water after 28 days of hardening in water at the temperature of 20°±2° C. is within the range of from 500 to 650 kgf/cm². The samples have a beam-like configuration with the dimensions of 4×4×16 cm).

Due to the presence of calcium chloride in the raw mixture in an amount of from 6 to 20% by weight, processes of clinker formation occur in a salt melt and are completed at a temperature within the range of from 1,000° to 1,100° C.

The presence of a magnesium-component in the raw mixture ensures stabilization of the highly-basic calcium silicate, resulting from calcination of the raw mixture, in the form possessing a high hydration activity.

The raw mixture for the production of cement is prepared by separate or combined grinding of the starting components and homogenization thereof (in the case of separate grinding). The grinding can be performed both in the presence of water (wet grinding) and without water (dry grinding). In wet grinding, water is added in an amount of from 25 to 35% of the total weight of the starting components. In the case of wet grinding of the starting components, calcium chloride can be used as a dry product or as an aqueous solution of a required concentration. After dry grinding the resulting raw mixture can be granulated with the addition of water in an amount of from 6 to 9% to pellets of a 5 to 20 mm diameter.

A cement clinker is produced from the thus-prepared raw mixture which may be in the form of raw flour, granules, or slurry in admixture with water which is delivered into a thermal unit, wherein calcination is performed at a temperature within the range of from 1,000° to 1,100° C. To produce cement, the clinker is discharged from the thermal unit and ground. During the grinding stage, said clinker might be incorporated with certain additives such as gypsum, an active mineral additive, to impart to the cement some specific properties.

Calcium chloride which is a component of the raw mixture according to the present invention can be used both in pure form and in the form of a calcium chloride containing components. This component can be introduced into the raw mixture either at the stage of grinding of the components or fed into the calcination thermal unit separately from the other raw mixture components being charged into the thermal unit; in doing so, said feed of calcium chloride and that of a mixture of other starting components is effected continuously.

For a better understanding of the present invention, the following specific Examples illustrating preparation of the raw mixture and production of cement therefrom are given hereinbelow. In all the Examples activity of cement is characterized by an ultimate tensile strength upon bending and compression strength as defined for samples with the dimensions of 4×4×16 cm consisting of 1 part by weight of cement, 3 parts by weight of quartz sand and 0.5 part by weight of water, after 28 days of water-hardening at the temperature of 20° ± 2° C.

EXAMPLE 1

A raw mixture of the following composition is prepared, percent by weight:

| | |
|---|---|
| calcite (calculated for CaO) | 30 |
| quartz sand (calculated for $SiO_2$) | 16 |
| commercial alumina (calculated for $Al_2O_3$) | 2.4 |
| hematite (calculated for $Fe_2O_3$) | 0.6 |
| chemically pure calcium chloride | 18.8 |
| magnesite (calculated for MgO) | 8 |

| -continued | |
|---|---|
| losses at calcination | 24.2. |

The above-mentioned components are ground together to give a residue of not more than 10% by weight on a sieve with the hole diameter of 80 mcm. The resulting raw mixture is granulated to pellets with a diameter of from 10 to 15 mm.

The granulated raw mixture is fed into a furnace, herein calcination is performed at the temperature of 1,100° C. till the clinker-formation process is completed. To produce cement, the clinker is discharged from the furnace and ground together with an additive of gypsum dihydrate (3% by weight of the clinker as calculated for $SO_3$). The fineness of the ground product is characterized by a residue of not more than 15% by weight on a sieve with the hole diameter of 80 mcm.

The thus-produced cement has the following properties:

| ultimate tensile strength upon bending, kgf/cm$^2$ | 59 |
|---|---|
| ultimate compression strength, kgf/cm$^2$ | 442. |

EXAMPLE 2

A raw mixture is prepared having the following composition, percent by weight:

| marbled lime (calculated for CaO) | 33.26 |
|---|---|
| diatomaceous earth (calculated for $SiO_2$) | 13.84 |
| china clay (calculated for $Al_2O_3$) | 6.99 |
| pyrite cinders (calculated for $Fe_2O_3$) | 2.99 |
| commercial calcium chloride (calculated for $CaCl_2$) | 10.0 |
| magnesite (calculated for MgO) | 4 |
| losses at calcination | 28.92. |

Grinding of the above-mentioned components, granulation of the resulting raw mixture, calcination thereof and grinding of cement clinker are effected in a manner similar to that described in the foregoing Example 1.

The thus-produced cement has the following properties:

| ultimate tensile strength upon bending, kgf/cm$^2$ | 72 |
|---|---|
| ultimate compression strength, kgf/cm$^2$ | 573. |

EXAMPLE 3

A raw mixture is prepared having the following composition, percent by weight:

| chalk (calculated for CaO) | 42.3 |
|---|---|
| quartz sand (calculated for $SiO_2$) | 12.5 |
| china clay (Calculated for $Al_2O_3$) | 12.4 |
| high-iron content slag from copper smelting (calculated for $Fe_2O_3$) | 4.4 |
| commercial calcium chloride (calculated for $CaCl_2$) | 6.0 |
| periclase (MgO) | 1.5 |

| -continued | |
|---|---|
| losses at calcination | 20.9. |

These components are subjected to wet grinding; in doing so, calcium chloride is fed to the grinding stage in the form of a 20% aqueous solution. The ground product is charged into a rotating furnace, wherein calcination of the raw mixture is performed at the temperature of 1,000° C. for one hour. The resulting cement clinker is discharged from the furnace and subjected to grinding. The final cement has the following properties:

| ultimate tensile strength upon bending, kgf/cm$^2$ | 72 |
|---|---|
| ultimate compression strength, kgf/cm$^2$ | 612. |

Cement produced for the purpose of comparison from the same raw mixture but without periclase following the same procedure has the following characteristics:

| ultimate tensile strength upon bending, kgf/cm$^2$ | 27 |
|---|---|
| ultimate compression strength, kgf/cm$^2$ | 312. |

EXAMPLE 4

A raw mixture having the following composition is prepared, percent by weight:

| magnesial lime, | |
|---|---|
| calculated for CaO | 30.5 |
| calculated for MgO | 3.6 |
| loess loam, calculated: | |
| for $SiO_2$ | 17.5 |
| for $Al_2O_3$ | 4.1 |
| for $Fe_2O_3$ | 1.6; |
| commercial calcium chloride (calculated for $CaCl_2$) | 20.0 |
| losses at calcination | 22.7. |

Grinding of the above-mentioned components, granulation of the raw mixture, calcination thereof and grinding of the resulting cement clinker are performed following the procedure described in Example 1 hereinbefore.

The thus-produced cement has the following properties:

| ultimate tensile strength upon bending, kgf/cm$^2$ | 69 |
|---|---|
| ultimate compression strength, kgf/cm$^2$ | 517. |

What is claimed is:

1. A raw mixture for the production of cement consisting of calcareous, siliceous, aluminous, ferrous and magnesium-containing components and calcium chloride contained in the raw mixture in the following proportions, percent by weight:

| calcareous component calulated per CaO | 30 to 42.3 |
|---|---|
| siliceous component calculated for $SiO_2$ | 12.5 to 17.5 |
| aluminous component calculated for $Al_2O_3$ | 1.6 to 12.4 |
| ferrous component calculated for $Fe_2O_3$ | 0.6 to 4.4 |

-continued

| | |
|---|---|
| magnesium-containing component calculated for MgO | 1.5 to 8 |
| calcium chloride | 6 to 20 |
| losses at calcination | the balance. |

2. A raw mixture according to claim 1, wherein said mixture is effective to produce cement clinker at a calcination temperature of about 1000° C. to 1100° C.

3. A raw mixture according to claim 1, wherein said mixture is effective to produce cement clinker at a calcination temperature of about 1000° C. to 1100° C. and wherein cement produced from said clinker has an ultimate compression strength of about 500 to 650 kgf./cm.$^2$ after 28 days of hardening.

4. A method of producing cement clinker having a high hydration activity which comprises sintering the raw mixtures defined in claim 1 at a temperature of about 1000° to 1100° C.

5. A method of producing cement clinker according to claim 4 wherein said clinker is effective to produce cement having an ultimate compression strength of about 500 to 650 kgf./cm.$^2$ after 28 days of hardening.

* * * * *